United States Patent Office 2,801,155
Patented July 30, 1957

2,801,155

METHOD OF PRODUCING MAGNESIUM HYDROXIDE FROM DOLOMITE BY MEANS OF NITRIC ACID

Otto Kippe, Osnabruck, Germany, assignor of one-half to Paul O. Tobeler, doing business as Trans Oceanic, Los Angeles, Calif.

No Drawing. Application March 24, 1955, Serial No. 496,593

12 Claims. (Cl. 23—201)

This invention has to do generally with an improved process for separating magnesia from recoverable nitrogenous compounds following their production from dolomite, and relates particularly to improved methods for recovering nitrogenous impurities from the separated magnesia in the normal course of purifying the latter as by washing, and the subsequent re-utilization of the impurities in the dolomite dissolving process to permit their ultimate recovery in the form of nitrogenous fertilizers.

It is known in the art that a solution of crude dolomite dissolved in nitric acid may be reacted upon by burned dolomite, hydrated or slaked dolomite or small amounts of ammonia to produce magnesia and nitrogenous compounds including calcium nitrate, ammonium nitrate and ammonia. These reactions take place according to the following equations:

(1) $CaCO_3 \cdot MgCO_3 + 4HNO_3 \rightarrow Ca(NO_3)_2 + Mg(NO_3)_2 + 2H_2O + 2CO_2$ (2) $Ca(NO_3)_2 + Mg(NO_3)_2 + CaO \cdot MgO + 2H_2O \rightarrow 2Mg(OH)_2 + 2Ca(NO_3)_2$ (3) $Ca(NO_3)_2 + Mg(NO_3)_2 + Ca(OH)_2 \cdot Mg(OH)_2 \rightarrow 2Mg(OH)_2 + 2Ca(NO_3)_2$ (4) $Ca(NO_3)_2 + Mg(NO_3)_2 + 4NH_3 + 2H_2O \rightarrow Ca(NO_3)_2 + Mg(OH)_2 + 2NH_4NO_3 + 2NH_3$ (5) $Ca(OH)_2 \cdot Mg(OH)_2 + 2HNO_3 \rightarrow Mg(OH)_2 + Ca(NO_3)_2 + 2H_2O$ Recovery of the magnesia precipitate in an impure form from the resultant mother solution containing such nitrogenous compounds in solution is suitably and economically obtained by a filtration process, the impurities comprising small amounts of calcium nitrate, ammonium nitrate and certain amounts of ammonia gas. The mother solution is of course, subjected to further processing in accordance with known methods, such as evaporating its water content to extract the nitrogenous compounds for use as fertilizers.

In the purification of the separated magnesia, the impurities contained therein are ordinarily dissolved and removed in the wash water, which is not re-used. This procedure is wasteful of the impurities, which would otherwise have value in a recovered state as commercial fertilizers; however, separation and recovery of these nitrogenous compounds from the water is not considered economical in view of the extended treatment necessary to such separation.

It has now been discovered that, in accordance with the present invention, recovery of the nitrogenous impurities contained in the wash water is possible through the utilization of the waters for the production of the nitric acid which is in turn used to dissolve the crude dolomite, whereby the nitrates and ammonia contained as impurities in the wash water are carried over into the mother solution formed upon dissolving the dolomite with the nitric acid. This method makes possible the economic recovery of all of the nitrogenous compounds without wasteful disposition of such of the compounds as accompany the magnesia precipitate as impurities during its separation from the mother solution.

Commercially, large quantities of nitric acid are obtained from synthetic ammonia through oxidation thereof according to the following equations:

(6) $4NH_3 + 5O_2 \rightarrow 4NO + 6H_2O$ (7) $2NO + O_2 \rightarrow 2NO_2$ (8) $2NO_2 + H_2O + \frac{1}{2}O_2 \rightarrow 2HNO_3$ In these processes, the nitric oxide produced from ammonia combines with oxygen to form nitrogen dioxide, and the latter is then converted in cooling towers into 40 to 50 percent nitric acid by the addition of air and water, the water normally being sprayed into the towers.

In accordance with the present invention, instead of using pure water to produce nitric acid, the wash waters collected following washing of the magnesia are conveniently sprayed into the oxidation towers, and as a result, the impurities contained in the wash water are carried into the nitric acid in the form of nitrates of calcium and ammonium, ammonium nitrate being formed in the towers. Upon the subsequent use of the nitric acid for dissolving raw dolomite, the nitrates of calcium and ammonium enter the mother solution as nitrogenous compounds adapted to be extracted for use as commercial fertilizers. Some of the ammonium nitrate contained in the mother solution reacts advantageously with burned dolomite to produce magnesia in accordance with the following formula:

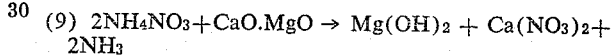

(9) $2NH_4NO_3 + CaO \cdot MgO \rightarrow Mg(OH)_2 + Ca(NO_3)_2 + 2NH_3$

Several possible uses of the wash waters containing the nitrate impurities and ammonia are available. In keeping with the present invention, one such use, which is described above, involves the direct production of nitric acid in cooling towers by means of the wash waters reacted with air and oxides of nitrogen, the resulting nitric acid containing the nitrates then being used to dissolve raw dolomite. A variation of this use of the wash waters comprises spraying the wash waters directly over the raw dolomite in dissolving towers, air and oxides of nitrogen being simultaneously injected into the towers and suitably from beneath the dolomite. In this method, the formation of nitric acid and the solution of raw dolomite take place simultaneously in the same zone, the resultant solution being collected for further treatment with burned or slaked dolomite or ammonia.

It is also possible to utilize the wash waters containing the nitrate impurities for spraying the dolomite in dissolving towers, while at the same time flowing nitric acid onto the dolomite, whereby the wash waters reduce the concentration of the acid to a desired degree and the nitrate impurities are carried into the resulting solution. Each of the several methods described leads to the same result, which is the re-utilization of the nitrate impurities and ammonia contained in the wash waters in such a way as to enable their ultimate extraction from the mother solution as commercial fertilizers. As a result, the process of producing magnesia and nitrogenous compounds from raw dolomite is improved, and the economy of the process is increased in direct proportion to the quantities of magnesia and nitrogenous compounds produced.

The specific steps of the complete process comprise reacting raw dolomite with nitric acid containing nitrates of calcium and ammonium, or with separate nitric acid and separate wash water containing nitrates of calcium and ammonium, the reaction being carried out in a first zone to form a mother solution containing nitrates of calcium, magnesium and ammonium. Next, the mother solution is treated in the same zone or in a second zone with an alkaline compound of the group consisting of ammonia gas, burned dolomite or slaked dolomite, or a combination of two or more thereof, to produce resultant compounds comprising magnesium hydroxide precipitate plus recoverable nitrogenous compounds including nitrates of calcium and ammonium, and in addition some ammonia. The magnesium hydroxide precipitate is then separated from the dissolved nitrogenous compounds as by a filtering step, yielding magnesium hydroxide in an impure form, that is, magnesium hydroxide precipitate together with nitrogenous impurities. The latter are separated from the magnesium hydroxide by aqueous washing to dissolve and carry away the ammonium and calcium nitrates plus dissolved ammonia gas impurities in the wash water, resulting in the desired production of pure magnesium hydroxide.

The wash water containing the nitrogenous impurities is then utilized in one of several closely related ways, having in common the economical reintroduction of the impurites into the mother solution, in order not to waste the impurities. One such use of the wash water containing the nitrogenous impurities is in the production of the nitric acid which is subsequently used to dissolve the raw dolomite. Another use of the waters containing the impurities is to introduce them directly into dolomite dissolving towers as by spraying, and simultaneously flowing nitric acid onto the dolomite, or introducing oxygen and oxides of nitrogen into the towers for combination with the wash waters to produce the nitric acid required for dissolving the dolomite. All of these methods have in common the recirculation of the nitrogenous impurities back into the mother solution formed on dissolving the raw dolomite by nitric acid.

Example 100 kg. dolomite containing 31.5% CaO and 20% MgO as carbonate are dissolved in 300 liters of nitric acid 1.23. Into this solution with a specific gravity of 1.375 are introduced 10 kg. ammonia as gas or 40 liters of 25% ammonia. Then 46 kg. calcined and ground or slaked dolomite are mixed therewith by stirring. Conversion takes place rapidly, and after 15 minutes the hydroxyd of magnesium is separated from the calcium nitrate solution by means of a filter press or rotary vacuum-drum filter. The cake containing 80% mother liquid with 38% nitrate of calcium and 3% ammonia is washed with 230 liters water on this filter and dissolved and removed the nitrate impurities out of the cake. The pure cake in gravity of 168 kg. is dried and calcined. The yield will be 39 kg. magnesia with 1.6% CaO. The ammoniacal calcium nitrate lye of 1.35 specific gravity is neutralized with nitric acid and when in vacuum evaporated yields 180 kg. calcium nitrate. The wash water in a quantity of 250 liters of 1.06 specific gravity with 8% Ca $(NO_3)_2$ and 0.4% $NH_3$ is used by the invention to make nitric acid and solution of the crude dolomite in the place of common water. The nitrate of calcium and ammonia of wash water go in circulation and are profitable as nitrogenous fertilizers.

I claim:

1. The process for producing magnesium hydroxide and recoverable nitrogenous compounds from starting dolomite, that includes dissolving raw dolomite in nitric acid containing nitrates of calcium and ammonia to form a solution containing nitrates of calcium, magnesium and ammonia, reacting said solution with an alkaline compound of the group consisting of ammonia, the oxides of magnesium and calcium and hydrated dolomite lime to produce resultant compounds comprising magnesium hydroxide precipitate and nitrogenous compounds including nitrates of calcium and ammonia, separating impure magnesium hydroxide precipitate from said resultant compounds, aqueously washing said separated magnesium hydroxide precipitate to remove nitrate impurities therefrom in the wash water, reacting substantially all of said wash water with oxides of nitrogen and oxygen to form nitric acid containing said nitrate impurities, and using said formed nitric acid and nitrate impurities for dissolving said starting dolomite.

2. The continuous process for producing magnesia and recoverable nitrogenous compounds from dolomite, that includes dissolving in a first zone raw dolomite in nitric acid containing nitrates of calcium and ammonia to form a solution containing nitrates of calcium, magnesium and ammonia, reacting said solution with an alkaline compound of the group consisting of ammonia, the oxides of magnesium and calcium and hydrated dolomite lime to produce resultant compounds comprising magnesium hydroxide precipitate and nitrogenous compounds including nitrates of calcium and ammonia, separating impure magnesium hydroxide precipitate from said resultant compounds, aqueously washing said separated magnesium hydroxide precipitate to remove the nitrate impurities therefrom in the wash water, reacting all of said wash water with oxides of nitrogen and oxygen to form nitric acid containing said nitrate impurities, and recirculating said nitric acid and said nitrate impurities to said first zone.

3. The process as defined in claim 2, in which said wash water contains ammonia which is reacted with said oxides of nitrogen and oxygen to produce additional ammonium nitrate impurity in said nitric acid.

4. The process for producing magnesium hydroxide and recoverable nitrogenous compounds from dolomite that includes introducing into a dolomite containing zone nitric acid and wash water containing nitrates of calcium and ammonia for dissolving said dolomite to produce nitrates of calcium, magnesium and ammonia, reacting said nitrates with an alkaline compound of the group consisting of ammonia, the oxides of magnesium and calcium and hydrated dolomite lime to produce magnesium hydroxide precipitate and nitrogenous compounds including nitrates of ammonia and calcium, separating impure magnesium hydroxide precipitate from said nitrogenous compounds, aqueously washing said separated magnesium hydroxide precipitate to dissolve and remove nitrate impurities therefrom, and re-circulating substantially all of said wash water and dissolved nitrate impurities to said dolomite containing zone.

5. The process as defined in claim 4 in which said nitrogenous compounds and said impurities carried in the wash water include ammonia gas.

6. The process as defined in claim 5 in which said wash water and dissolved nitrate impurities are sprayed into said dolomite zone.

7. The process as defined in claim 6 in which said nitric acid is flowed onto said dolomite.

8. The process for producing magnesium hydroxide and recoverable nitrogenous compounds from dolomite, that includes introducing into a dolomite containing zone oxides of nitrogen and oxygen and wash water containing nitrates of calcium and ammonia to dissolve said dolomite and to thereby produce nitrates of magnesium, calcium and ammonia, reacting said nitrates with an alkaline compound of the group consisting of ammonia gas, the oxides of calcium and magnesium and hydrated dolomite lime to produce magnesium hydroxide precipitate and nitrogenous compounds including nitrates of ammonia and calcium, separating impure magnesium hydroxide precipitate from said nitrogenous compounds, aqueously washing said separated magnesium hydroxide precipitate to dissolve and remove nitrate impurities therefrom, and recirculating substantially all of said wash water and dissolved nitrate impurities to said dolomite containing zone.

9. The process as defined in claim 8 in which said nitrogenous compounds and said wash water contain ammonia, and in which said wash water and contained ammonia is reacted with said oxides of nitrogen and oxygen to produce additional ammonium nitrate.

10. The process as defined in claim 8 in which said oxides of nitrogen are injected into said zone from beneath said dolomite, and in which said wash water is sprayed over said dolomite.

11. In the process for producing relatively pure magnesium hydroxide and recoverable nitrogenous compounds from dolomitic material treated with nitric acid wherein magnesium hydroxide precipitate containing nitrogenous impurities is precipitated from the mother liquor containing said compounds and aqueously washed to remove the impurities therefrom, the steps that include reacting substantially all of the wash water with oxides of nitrogen and oxygen to form nitric acid containing said impurities, and treating the dolomitic material with the formed acid and impurities.

12. In the process for producing relatively pure magnesium hydroxide and recoverable nitrogenous compounds from dolomitic material treated with nitric acid wherein magnesium hydroxide precipitate containing nitrogenous impurities is precipitated from the mother liquor containing said compounds and aqueously washed to remove the impurities therefrom, the steps that include reacting all of the wash water with oxides of nitrogen and oxygen to form nitric acid containing said impurities and treating the dolomitic material with all of the formed acid and impurities.

References Cited in the file of this patent

UNITED STATES PATENTS

| | | |
|---|---|---|
| 1,904,946 | Kippe | Apr. 18, 1933 |
| 1,975,954 | Kippe | Oct. 9, 1934 |
| 2,004,000 | Hechenbleikner | June 4, 1935 |

FOREIGN PATENTS

| | | |
|---|---|---|
| 732,368 | France | June 14, 1932 |

OTHER REFERENCES

Schallis: "Economic Considerations . . . from Dolomite," Bureau of Mines (I. C. 7247) August 1943, pages 33 and 34.

Mellor: "Comprehensive Treatise on Inorganic . . . Theoretical Chemistry," vol. 8, pages 558 to 561 (1928).